UNITED STATES PATENT OFFICE 2,078,617

FRICTION ELEMENT AND BOND THEREFOR

Ray E. Spokes, Ann Arbor, Mich., assignor to American Brakeblok Corporation, New York, N. Y., a corporation of New York No Drawing. Application February 8, 1934, Serial No. 710,313

19 Claims. (Cl. 106—23)

This invention relates to friction elements of the kind used in brakes, clutches and like devices and to the method of making such elements.

It has been proposed heretofore to employ rubber in the bond in friction elements but as is well known rubber ages, breaks down and disintegrates when subjected to heat and sometimes this occurs even when the rubber is subjected to temperatures below that at which the rubber fuses or depolymerizes. One of the objects of this invention is to so protect rubber used in a bond for friction elements that the life of the rubber will be prolonged and its resistance to deleterious effect of heat will be greatly increased.

It has also been proposed to use resins in bonds for friction elements and heretofore phenol, ortho or meta cresols, resorcinol, and caroacrol, among others, have been used to produce phenolic condensation products, which are known as synthetic resins, but usually such resins have only one active group in their molecules and are semi-solid or highly viscous or contain excessive amounts of vegetable drying oil to render them oil soluble and all such resins require high temperatures to render them plastic and to cure them. Another object of this invention is to provide a bond for friction elements which contains a plastic synthetic resin that may be cured uniformly without being subjected to high temperatures.

For the most part the semi-solid or highly viscous resins heretofore used were not miscible with rubber or rubber cement and at their best these resins tended to form unstable emulsions. Consequently, when it has been desired to employ a phenolic condensation type resin with rubber or rubber cement as a bond in friction elements, a resin that has been fully reacted and which is in powdered form has been employed or one in a liquid state containing an appreciable amount of water and/or alcohol as a stabilizing agent has been used. Usually the quantity of the stabilizing agent is about twenty percent of the product and this is a serious disadvantage for the heat to which the bond is subjected in curing is sufficient to volatilize such low boiling point agents and it is not unusual for the resin to be "thrown out" when the quantity of agent is lessened by evaporation. The viscous phenolic condensation type resins containing appreciable quantities of vegetable drying oil, usually China-wood oil, are not miscible with rubber or rubber cement. It is, therefore, a further object of this invention to employ a synthetic resin which is readily miscible with rubber or rubber cement in a bond for friction elements to thereby enhance the desirable properties of the rubber and provide a bond which will not be softened, disintegrated or otherwise deleteriously affected by oil, grease or other similar products, which will be highly resistant to heat and moisture, and which, when compounded with other ingredients, will produce novel long-lived friction elements possessing exceptional strength and desirable frictional qualities.

A satisfactory bond for friction elements may be produced by using resin and rubber but it is essential that the resin be readily miscible with the rubber and to this end my invention contemplates using a synthetic resin made from the reaction products of anacardic acid and cardol such as are found in the liquid produced by the destructive distillation of the cellular shell of the cashew nut with an aldehyde. The condensation products of this cashew nut shell liquid and an aldehyde are unique because the liquid contains a number of groups which are active toward the aldehyde and for this reason it is possible to stop the condensation reaction of the liquid at any desired state of fluidity up to the completely condensed or solid state and in any degree of condensation up to the completely condensed state the products are readily miscible with rubber or a rubber cement in which any petroleum hydrocarbon or equivalent has been employed as the solvent. The preferred state of fluidity is such that the condensation products will be plastic and when mixed with other products will be capable of being shaped under pressure and is somewhat thicker than heavy molasses. Such condensation products, which are synthetic resins, when intermixed with rubber or rubber cement produce a bond which is quite satisfactory for use in friction elements for the bond is not softened, disintegrated or otherwise deleteriously affected by oils, greases or similar products and it is highly resistant to heat and moisture. Moreover, such resin has the property of plasticizing sulphur thereby rendering the sulphur more useful as a vulcanizer of the rubber because of the ease with which it can be thoroughly and uniformly intermixed in the rubber, and this resin has the quality of dissolving and mixing with rubber and sulphur in quantities ranging from the smallest to a great many times the amount of the resin itself. Furthermore, vulcanization may be effected by heat without pressure which is particularly advantageous in the manufacture of friction elements especially those of the type where a large amount of solvent is employed. A further advantage is that the friction elements described herein cure at the same rate as similar friction elements bonded with rubber and require similar heat for curing.

The resin described herein is miscible with all ordinary rubber solvents and the resin-rubber bond of this invention can be worked the same as ordinary rubber for molding and curing and under the same conditions. Ordinary fillers such as are used in rubber compounding including pitches are compatible with the resin described herein. Moreover, the bond (and the products in which it is used) is quite resistant to the passage of moisture and this resistance is, in fact, higher than that possessed by rubber when used alone. When pitch is used it serves as a friction controlling agent and also makes the bond when cured slightly thermoplastic.

A typical formula for the resin above described is as follows:

| | Parts |
|---|---|
| Cashew nut shell liquid | 2000 |
| Cresylic acid (97-99% pale) | 2000 |
| 40% formaldehyde | 2400 |
| 28° ammonia | 160 |

To produce this resin the cashew nut shell liquid and the formaldehyde and ammonia are first reacted together and the cresylic acid is added later to catch the reaction product as it is formed to thereby prevent the formation of a gummy reaction product and it is known that phenol or resorcinol will serve this purpose equally well. The ammonia is a catalyst and I prefer to use it to facilitate the reaction but it is not essential and may be omitted or other catalyst suitable for the purpose may be employed. The cresylic acid, or its equivalent, has the effect of blanketing or retarding the rate of reaction between the cashew nut shell liquid and the formaldehyde and there is a complex reaction between the cresylic acid, cashew nut shell liquid and formaldehyde that produces a distinctive product which is a thick viscous resin. Acetaldehyde, paraldehyde, benzaldehyde, furfuraldehyde, or other resin forming aldehydes can be used instead of formaldehyde. However, formaldehyde is preferred in gaseous solution, gaseous form, or in polymerized form called paraform. This resin is readily miscible with rubber or rubber cement and these substances produce a desirable bond for friction elements especially when sulphur is added.

While the resin-rubber bond of this invention may be used in friction elements having any desired ingredients, a typical formula for friction elements in which the bond is used is as follows:

| | Parts |
|---|---|
| Asbestos | 50 |
| Carbon | 10 |
| 30% rubber cement | 22 |
| Resin | 6 |
| Sulphur | 6 |

In this formula, preferably both long and short fibre asbestos are used and I prefer to use about eighty percent short fibre asbestos and twenty percent medium long spinning fibre asbestos.

The carbon serves as a filler and I prefer to use the graphitic type carbons of the kind which are made by burning oil or gas or mixtures and playing the flame against a hot brick checkerwork to break up the hydrocarbons prior to the depositing of the carbons. Carbons thus formed are not graphitic in the same sense as graphite but are of a somewhat graphitic character and are dustless, denser and possess considerably more heat resistance than the amorphous type carbons commonly known as channel blacks. I have found that carbons of this latter kind are too absorptive when used with binders containing a large amount of solvent and thus prevent the uniform distribution of the bond. The heat resisting carbons of the kind which I employ coat over the asbestos during the gradual erosion of the friction element in use and reduce the tendency of the element to squeal. These carbons are known in the trade as Thermatomic and are finely divided soft carbons made by the thermal decomposition of natural gas. One of their chief differences from channel blacks is their softness and this distinguishes them from carbon black. They do not cause undue stiffening of the rubber in the cured or uncured form and impart excellent mixing properties and shorten rather than retard the cure of the friction element. Channel black or carbon blacks could be used, subject to the objections set forth, but such carbons would be used in smaller proportions than that specified in the typical formula.

I prefer to use rubber cement having a hydrocarbon solvent which has an initial distillation point of 240° F. and a dry end point of 310° F. for this is a convenient way of handling the rubber in compounding the friction elements but rubber may be used in other forms and I believe that many rubber substitutes may be used.

The flexibility of the friction element may be increased by decreasing the cresylic acid content of the bond or by adding a drying oil in such proportions as desired. Moreover, a drying oil may be compounded with the resin described herein in place of the rubber and vulcanizing agent and a friction element having proper frictional qualities and a high degree of flexibility may be produced in this manner.

Sulphur is specified in the typical formula but sulphur compounds or other vulcanizing agents may be used since the sulphur is used for vulcanization.

A friction element is formed by thoroughly mixing the resin and rubber cement and then adding and mixing in the sulphur. Then the carbon is added without interrupting the mixing action. When the carbon has been thoroughly intermixed with the other ingredients the short fibre asbestos is added and after this has been thoroughly intermixed with the other ingredients the long fibre asbestos is added and the mixing action is continued for a few minutes; for example, for about five minutes. Preferably the mixing is carried out in a mechanically operated mixer of a type which will not break up the long fibre asbestos. I have found that the best results can be obtained by compounding the ingredients in the foregoing manner because this is most conducive to thorough and proper intermixing of the ingredients, and when the ingredients are compounded in this manner the mixture may be extruded and the mixture is sufficiently stable so that no appreciable setting up or drying occurs at the surface, at least for a few hours under ordinary atmospheric conditions.

The mixture is extruded and cut into biscuits of a size approximating the mold in which the biscuit is pressed into the form of a friction element. By following this procedure a more homogeneous friction element may be formed than by introducing separate portions of the mixture into the mold. After the biscuit is introduced into the mold it is subjected to an initial pressing operation at about three thousand pounds per square inch; then the biscuit is subjected to a preliminary heating for the purpose of removing the solvent; then the biscuit is subjected to a second pressing operation in the mold at about six thousand pounds per square inch; and then the biscuit is subjected to a final heating to cure.

The preliminary heating should be carried out in a manner which will drive off the solvent without vulcanizing the bond and without trapping gases within the biscuit to form gas pockets and without distorting the biscuit. The temperature may be raised gradually under automatic control to a degree and for a period sufficient for the purpose or it may be raised in steps under manual control until the solvent is driven off. The temperature and time will vary with the solvent used and with the conductivity and thickness of the biscuit, and care should always be exercised not to carry either temperature or time to the point where the bond is vulcanized or the biscuit distorted. A typical preliminary heating may be carried out by introducing the initially pressed biscuit into an oven at a temperature of approximately 75° F. and uniformly raising the temperature during a period of about five hours to approximately 175° F. and maintaining this temperature for about eleven hours.

In the final pressing operation the biscuit is reduced to final size and shape and to facilitate handling it may be cooled after the preliminary heating, but this cooling is not necessary if it is convenient to handle the hot biscuit.

In the curing operation substantially the same procedure is followed as in the preliminary heating except that the temperature is raised at substantially the same rate to approximately 300° F. and maintained until uniform vulcanization has been attained. The curing operation may be performed in shorter time, about eight hours, if conducted under pressure and at a temperature of 300° F. in accordance with the usual practice of pressure vulcanization.

An important characteristic of the resin-rubber bond described herein is that the wettability of the bond to the solids is not lessened by the incorporation of appreciable quantities of pitch materials such as the asphaltic, bituminous or synthetic types. I may incorporate pitch in the bond to increase the frictional qualities of the element and when pitch is used it is desirable to incorporate it with the resin during the preparation of the bond to insure uniform distribution of the pitch in the final product. I may use stearine pitch in an amount approximately equal to one percent of the total weight of the product in the typical formula, and this pitch will be mixed thoroughly with the resin, rubber and sulphur so as to be distributed homogeneously in the element and it will carbonize on the wearing surface and augment the friction properties of the friction element.

Resins of the type described herein plasticize sulphur which may therefore be thoroughly and uniformly intermixed with the rubber to thereby facilitate vulcanizing of the rubber. Moreover, when the resin is compounded with rubber and a vulcanizing agent as described and then used as a bond in friction elements, it is possible to produce friction elements possessing exceptional strength which is probably due to the tenacity with which the bond adheres to the other ingredients. Moreover, friction elements having this bond are impervious to moisture, oil, grease and other similar products which is an especial advantage in friction elements used in the brakes of automotive vehicles and the like. An additional advantage is the ease with which friction elements may be manufactured for the bond produces a mixture which may be conveniently handled prior to the time it is pressed to form the friction element and moreover the bond cures uniformly throughout the element which eliminates uncured or partially cured areas in the element which would decrease the strength of the element.

Cashew nut shell liquid occurs in the cellular husk or shell which grows about the kernel of the cashew nut and this liquid contains anacardic acid and cardol. It is to be understood that in the claims set forth and comprising part of this application the term cashew nut shell liquid is intended to cover these materials together or severally from whatever source they originate whether natural or artificial insofar as they are effective in producing the results herein set forth.

The methods which I have set forth and described are preferred but modifications and changes may be made therein and in the various steps thereof without modifying or changing the essential features and characteristics of the products and such products remain essentially the same although modifications may be made in appearance, texture and in the physical and chemical characteristics; and while I have given typical formulas I do not limit myself thereto for it will be apparent to those skilled in the art that other formulas may be employed within the scope of the following claims.

I claim:

1. A heat, moisture, oil, and grease resistant non-squealing bond for friction elements and the like containing a uniform dispersion of rubber, a vulcanizing agent, and a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond to prevent oxidation of the rubber.

2. A heat, moisture, oil and grease resistant non-squealing bond for friction elements and the like containing a uniform dispersion of rubber, a vulcanizing agent, pitch, and a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond to prevent oxidation of the rubber.

3. A heat, moisture, oil and grease resistant non-squealing bond for friction elements and the like containing a uniform dispersion of rubber, a vulcanizing agent, a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond to prevent oxidation of the rubber, and a sufficient quantity of a drying oil to impart a high degree of flexibility to the friction element or the like in which the bond is used.

4. A heat, moisture, oil and grease resistant non-squealing bond for friction elements and the like containing a uniform dispersion of rubber, a vulcanizing agent, pitch, a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond to prevent oxidation of the rubber, and a sufficient quantity of drying oil to impart a high degree of flexibility to the friction element or the like in which the bond is used.

5. A heat, moisture, oil and grease resistant non-squealing bond for friction elements and the like containing a uniform dispersion of rubber, a vulcanizing agent, and a condensation product of cashew nut shell liquid, formaldehyde, cresylic acid and ammonia.

6. A heat, moisture, oil and grease resistant non-squealing bond for friction elements and the like containing a uniform dispersion of rubber, a vulcanizing agent, and a condensation product comprising substantially 200 parts of cashew nut shell liquid, 240 parts of 40% formaldehyde, 200 parts of cresylic acid and 16 parts of 28° ammonia.

7. A friction element containing a fibrous substance, a filler, and a heat, moisture, oil and grease resistant non-squealing bond containing a uniform dispersion of rubber, a vulcanizing agent, and a condensation product of cashew nut shell liquid and an aldehyde, the product having a long chain of unsaturated linkages that combine with unsaturated linkages of the rubber in the cure of the bond in the friction element and prevent oxidation and disintegration of the rubber.

8. A friction element containing a fibrous substance, a filler, and a heat, moisture, oil and grease resistant non-squealing bond containing a uniform dispersion of rubber, a vulcanizing agent, and a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond in the friction element and prevent oxidation and disintegration of the rubber.

9. A friction element containing asbestos, carbon, and a heat, moisture, oil and grease resistant non-squealing bond containing a uniform dispersion of rubber, a vulcanizing agent, and a condensation product of cashew nut shell liquid and an aldehyde, the product having a long chain of unsaturated linkages that combine with unsaturated linkages of the rubber in the cure of the bond in the friction element and prevent oxidation and disintegration of the rubber.

10. A friction element containing asbestos, carbon, and a heat, moisture, oil and grease resistant non-squealing bond containing a uniform dispersion of rubber, a vulcanizing agent, and a condensation product of cashew nut shell liquid, an aldehyde and a substance for blanketing or retarding the rate of the condensing action and selected from the group consisting of cresylic acid, phenol and resorcinol, the product having a long chain of unsaturatd linkages that combine with unsaturated linkages of the rubber in the cure of the bond in the friction element and prevent oxidation and disintegration of the rubber.

11. A friction element containing asbestos, carbon, and a heat, moisture, oil and grease resistant non-squealing bond containing a uniform dispersion of rubber, a vulcanizing agent, pitch, and a condensation product of cashew nut shell liquid and an aldehyde, the product having a long chain of unsaturated linkages that combine with unsaturated linkages of the rubber in the cure of the bond in the friction element and prevent oxidation and disintegration of the rubber.

12. A friction element containing asbestos, carbon, and a heat, moisture, oil and grease resistant non-squealing bond containing a uniform dispersion of rubber, a vulcanizing agent, pitch, and a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond in the friction element and prevent oxidation and disintegration of the rubber.

13. A friction element containing a fibrous substance, a filler, and a heat, moisture, oil and grease resistant non-squealing bond containing a uniform dispersion of rubber, a vulcanizing agent, a condensation product of cashew nut shell liquid and an aldehyde, the product having a long chain of unsaturated linkages that combine with unsaturated linkages of the rubber in the cure of the bond in the friction element and prevent oxidation and disintegration of the rubber, and a sufficient quantity of a drying oil to impart a high degree of flexibility to the friction element.

14. A friction element containing a fibrous substance, a filler, and a heat, moisture, oil and grease resistant non-squealing bond containing a uniform dispersion of rubber, a vulcanizing agent, a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond in the friction element and prevent oxidation and disintegration of the rubber, and a sufficient quantity of a drying oil to impart a high degree of flexibility to the friction element.

15. A friction element containing a fibrous substance, a filler, and a heat, moisture, oil and grease resistant non-squealing bond containing a uniform dispersion of rubber, a vulcanizing agent, pitch, a condensation product of cashew nut shell liquid and an aldehyde, the product having a long chain of unsaturated linkages that combine with unsaturated linkages of the rubber in the cure of the bond in the friction element and prevent oxidation and disintegration of the rubber, and a sufficient quantity of a drying oil to impart a high degree of flexibility to the friction element.

16. A friction element containing a fibrous substance, a filler, and a heat, moisture, oil and grease resistant non-squealing bond containing a uniform dispersion of rubber, a vulcanizing agent, pitch, a condensation product of cashew nut shell liquid, an aldehyde and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond in the friction element and prevent oxidation and disintegration of the rubber, and a sufficient quantity of a drying oil to impart a high degree of flexibility to the friction element.

17. A composition friction element containing asbestos, carbon, and a heat, moisture, oil and grease resistant non-squealing bond containing a uniform dispersion of rubber, a vulcanizing agent, and a condensation product of cashew nut shell liquid and an aldehyde, the product having a long chain of unsaturated linkages that combine with unsaturated linkages of the rubber in the cure of the bond in the friction element and prevent oxidation and disintegration of the rubber.

18. A composition friction element containing asbestos, carbon, and a heat, moisture, oil and grease resistant non-squealing bond containing a uniform dispersion of rubber, a vulcanizing agent, and a condensation product of cashew nut shell liquid, an aldehyde, and a substance for blanketing or retarding the rate of the condensing action and selected from the group consisting of cresylic acid, phenol and resorcinol, the product having a long chain of unsaturated linkages that combine with unsaturated linkages of the rubber in the cure of the bond in the friction element and prevent oxidation and disintegration of the rubber.

19. A friction element comprising substantially 50 parts of asbestos, 10 parts of carbon, 22 parts of 30% rubber cement, 6 parts of sulphur, and 6 parts of a condensation product of cashew nut shell liquid and an aldehyde, the product having a long chain of unsaturated linkages that combine with unsaturated linkages of the rubber in the cure of the bond in the friction element and prevent oxidation and disintegration of the rubber.

RAY E. SPOKES.